United States Patent
Nakase et al.

(10) Patent No.: US 8,294,789 B2
(45) Date of Patent: Oct. 23, 2012

(54) IMAGE PLAYBACK APPARATUS AND THE CONTROL METHOD, AND STORAGE MEDIUM THEREOF

(75) Inventors: Yuichi Nakase, Tokyo (JP); Yasuyuki Ogawa, Tokyo (JP); Mika Tsukuda, Kawasaki (JP); Megumi Yoshino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/683,056

(22) Filed: Jan. 6, 2010

(65) Prior Publication Data

US 2010/0177211 A1 Jul. 15, 2010

(30) Foreign Application Priority Data

Jan. 14, 2009 (JP) ................................ 2009-006120

(51) Int. Cl.
H04N 5/76 (2006.01)
(52) U.S. Cl. .................................................. 348/231.5
(58) Field of Classification Search ................ 348/231.5
See application file for complete search history.

(56) References Cited

U.S. PATENT DOCUMENTS

| 7,634,158 B2 | 12/2009 | Nakase et al. |
| 2002/0097449 A1* | 7/2002 | Ishii ................................ 358/452 |
| 2005/0110880 A1* | 5/2005 | Parulski et al. ............. 348/231.5 |
| 2006/0173918 A1 | 8/2006 | Nakase et al. |
| 2006/0195486 A1* | 8/2006 | Ohno et al. .................... 707/200 |
| 2007/0014543 A1 | 1/2007 | Nakase et al. |
| 2007/0206831 A1 | 9/2007 | Matsuno et al. |
| 2007/0211150 A1* | 9/2007 | Hirata ......................... 348/211.6 |

FOREIGN PATENT DOCUMENTS

| JP | 2004320514 A | 11/2004 |
| JP | 2008046675 A | 2/2008 |

* cited by examiner

*Primary Examiner* — James Hannett
(74) *Attorney, Agent, or Firm* — Fitzpatrick, Cella, Harper & Scinto

(57) ABSTRACT

An image playback apparatus, which is capable of playing back images recorded in a recording medium, acquires creation time and modification time which are time stamps of the image file, compares, compares the acquired creation and modification times, registers the matching time as the time management information of the image file when the creation time and the modification time match, or registers the older of the two times as the time management information of the image file when they do not match. The image playback apparatus selectively plays back image based on time management information registered for each of the image files.

16 Claims, 9 Drawing Sheets

IMAGE PLAYBACK APPARATUS AND THE CONTROL METHOD, AND STORAGE MEDIUM THEREOF

BACKGROUND OF THE INVENTION

1. Field of the Invention

The present invention relates to an image playback apparatus which plays back image data stored in a storage medium, and the control method, and storage medium thereof.

2. Description of the Related Art

Conventionally, a technique of sorting image data captured by a digital camera using differing time information has been suggested. In Japanese Patent Laid-Open No. 2004-320514 (reference 1 hereinafter), sorting of files created by a device is performed according to shooting times of the files, and externally acquired files are sorted using acquisition times. With this technique, a flag which indicates an image that is taken by the device itself and its shooting time are stored in the image file data, and the time to be used is determined by referring to the flag.

Further, Japanese Patent Laid-Open No. 2008-046675 (reference 2 hereinafter) discloses that when an image file is created, shooting time is recorded in creation time of the image file, and the creation time is recorded in modification time of the image file.

However, with the method described in reference 1, information regarding time cannot be acquired unless the information within the image data is not acquired. In other words, it is necessary to analyze image data for all images, and impedes high speed image search and playback. Further, with the method of reference 2, only those files created by the device itself are considered, but not the images acquired from external sources.

SUMMARY OF THE INVENTION

According to an embodiment of the present invention, the goal is to provide an image playback apparatus and a method thereof which performs search and playback of image files at a high speed and preferably according to the order of shooting time.

According to one aspect of the present invention, there is provided an image playback apparatus which is capable of playing back image files recorded in a recording medium, comprising: an acquiring unit configured to acquire a creation time and a modification time of each of the image files; a registering unit configured to compare the creation time and the modification time acquired by the acquiring unit, then register either a matching time if the creation time and the modification time match, or the older of the times if the times do not match, as time management information of each of the image files; and a playback unit configured to play back the image files based on the time management information registered for each of the image files by the registering unit.

Further features of the present invention will become apparent from the following description of exemplary embodiments with reference to the attached drawings.

DESCRIPTION OF THE EMBODIMENTS

Preferred embodiments of the present invention are explained below with reference to attached Figures.

[Regarding Structure of Digital Camera]

Figure 1A:
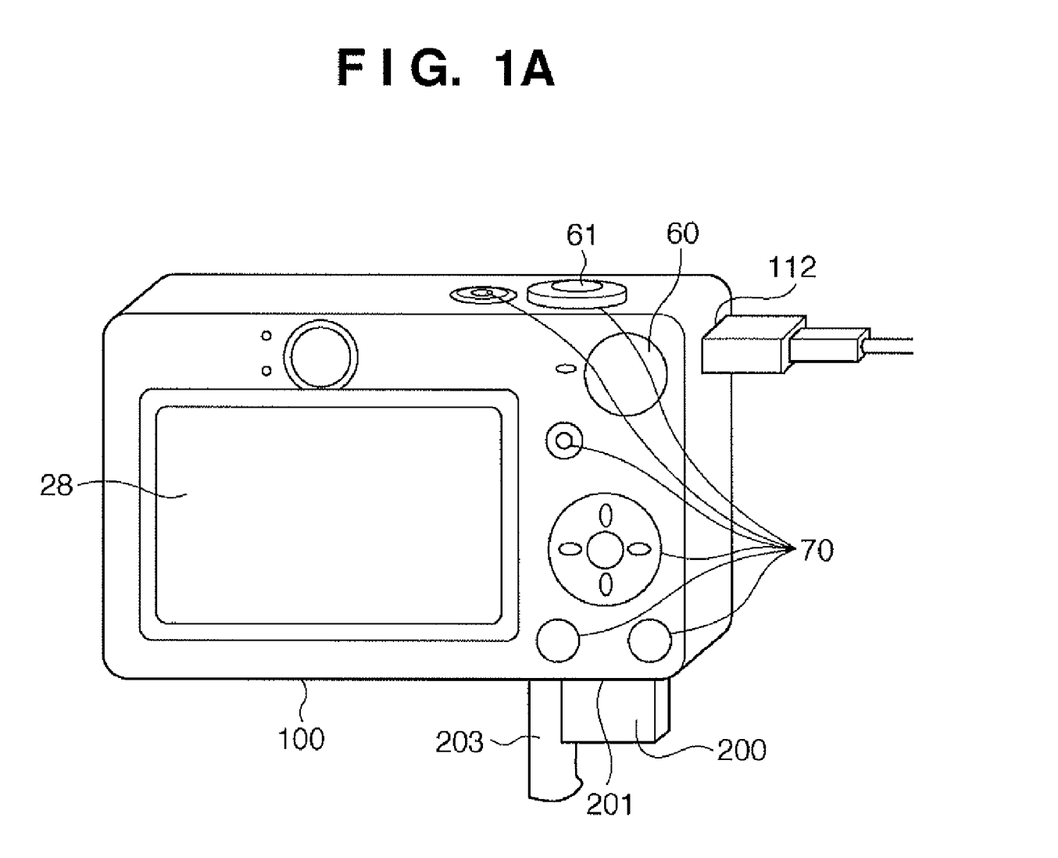
FIG. 1A is an external view of a digital camera as an example of an image playback apparatus according to an embodiment.

An external view of a digital camera 100 is provided in FIG. 1A as an example of the playback apparatus of the present invention. An image display unit 28 is a display unit which displays images and various types of information. A shutter button 61 is an operation unit for performing shooting orders. A mode dial 60 is an operation unit for switching between various modes. A connector 112 is a connector for a connection cable and the digital camera 100. An operation unit 70 is an operation unit comprised of operational members such as various switches, buttons and a touch panel that receive various operation from a user. A recording medium 200 is a recording medium such as a memory card or a hard disc. A recording medium slot 201 is a slot which accommodates the recording medium 200. The recording medium 200 which is inserted into the recording medium slot 201 is capable of communication with the digital camera 100. A lid 203 is a lid for the recording medium slot 201.

Figure 1B:
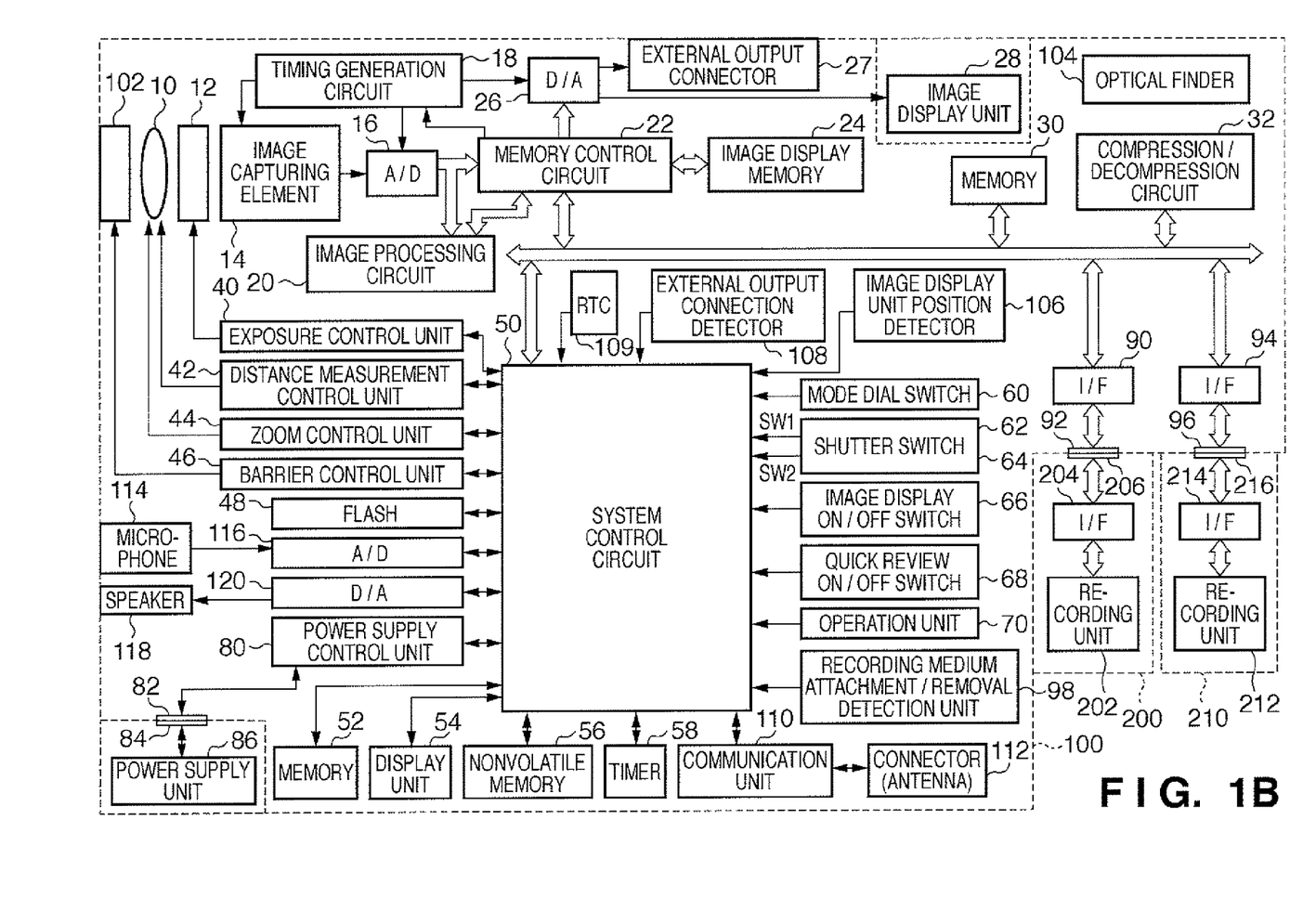
FIG. 1B is a block diagram indicating exemplary makeup of a digital camera according to an embodiment.

FIG. 1B is a block diagram indicating exemplary makeup of a digital camera 100 according to an embodiment.

As shown in FIG. 1B, the digital camera 100 comprises a shooting lens 10, a shutter 12 having a function as an aperture, and an image capturing element 14 which converts an optical image to an electric signal. Also, the digital camera 100 comprises an A/D converter 16, which converts analog signal output of the image capturing element 14 to digital signals. In the digital camera 100, a timing generation circuit 18 supplies clock signal and control signal to the image capturing element 14, the A/D converter 16, and a D/A converter 26. The timing generating circuit 18 is controlled by a memory control circuit 22 and a system control circuit 50.

An image processing circuit 20 performs pixel correction processing and color conversion processing on data from the A/D converter 16 or from the memory control circuit 22. Also, the image processing circuit 20 performs certain computational processing using captured image data. The system control circuit 50 performs AF (auto-focus) processing, AE (auto-exposure) processing, EF (Electronic flash pre-emission) processing, and TTL-type AWB (auto white balance) processing, based on the computation result acquired at the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. The data from the A/D converter 16 is written into the image display memory 24 or the memory 30 via the image processing circuit 20 and the memory control circuit 22, or directly through the memory control circuit 22.

The digital camera 100 comprises the image display memory 24, the D/A converter 26, and an external output connector 27 which outputs the output of the D/A converter 26 to an external monitor. If a connector is inserted into the external output connector 27, the system control circuit 50 is able to know the status of external output status from the external output connection detector 108.

The image display unit 28 is comprised by, for example, a liquid crystal display of the TFT type. The image data to be displayed and written into the image display memory 24 is displayed by the image display unit 28 via the D/A converter 26. If the shot image data is displayed sequentially using the image display unit 28, it is possible to realize the function of an electronic view finder. Further, the image display unit 28 is capable of optionally having the display ON/OFF according to the instruction from the system control circuit 50, and if the display is set to OFF, it is possible to drastically reduce electricity consumption of the digital camera 100.

Further, the image display unit 28 is connected to the body of the digital camera 100 via a rotatable hinge unit, and allows freedom in setting the direction and angle of the camera, playback display function, and various display functions. Further, it is possible to store the image display portion of the image display unit 28 facing the digital camera 100. In such a case, the system control circuit 50 detects the storage status of the display portion of the image display unit 28 using an image display unit position detector 106 and stops display operation of the image display unit 28.

The memory 30 for storing captured still images and moving images, has enough capacity for storing a certain number of still images and a certain length of moving images. With this, it is possible to speedily store large amounts of image data into the memory 30 even when performing rapid-fire image capturing or panoramic image capturing, both of which requires consecutively shooting a plurality of still images. Further, the memory 30 can also be used as the work space for the system control circuit 50. The memory 30 can also be used as a write buffer for the recording media 200 and 210. The compression/decompression circuit 32 compresses and decompresses image data using methods such as adaptive discrete cosine transform (ADTC). The compression/decompression circuit 32 reads the images stored in the memory 30, performs compression or decompression processing, and then writes the processed data into the memory 30.

An exposure control unit 40 controls the shutter 12 comprising an aperture function. The exposure control unit 40 also comprises a flash exposure control function by being linked to a flash 48. A distance measurement control unit 42 controls focusing of the shooting lens 10. A zoom control unit 44 controls zooming of the shooting lens 10. A barrier control unit 46 controls operation of a lens barrier 102 that protects the shooting unit comprising the shooting lens 10. The flash 48 also has the functions of light projection for AF assistance light and flash exposure control. The exposure control unit 40 and the distance measurement control unit 42 are controlled using the TTL method, and are controlled by the system control circuit 50 based on computation results of the captured image data by the image processing circuit 20.

The system control circuit 50 controls the entire digital camera 100. The system control circuit 50 realizes processing of various examples to be discussed below, by executing a program stored in a nonvolatile memory 56. A memory 52 is used for storing constants and variable for the operation of the system control circuit 50. The memory 52 is also used for developing programs read from the nonvolatile memory 56.

A display unit 54 is made of parts such as an LCD display device and speakers which displays operational status, message, etc., using text, images, sounds, etc. in accordance with the program executed at the system control circuit 50. The display unit(s) 54 is placed at a single location or multiple locations which can be easily checked visually and in close proximity of the operation unit of the digital camera 100 and is structured using combinations of, for example, LCD, LED and sound generating elements. Further, a part of the functions of the display unit 54 is placed within an optical finder 104. Among the content displayed on the display unit 54, those that are to be displayed on devices such as the LCD are aperture value, exposure correction, flash, macro shooting, buzzer setting, battery remaining, error display, attachment of the recording media 200 and 210, etc. Further, among the displayed content of the display unit 54, ones that are to be shown within the optical finder 104 are focus display, camera shake warning, flash charge status, shutter speed, aperture value, exposure correction, etc.

The nonvolatile memory 56 is a memory, such as EEPROM, in which data can be electrically written and deleted. In the nonvolatile memory 56, items such as constants and programs for operation of the system control circuit 50 are stored. The term program as used herein indicates a program that is used to execute various flowcharts to be mentioned later. The program in the present specification means computer program that causes the system control circuit 50 to execute processing describe later with reference to various flowcharts. 58 is a timer, which is used to measure speed of data storage of the recording media 200 and 210 and data rate of acquired data.

The reference numerals 60, 62, 64, 66, 68 and 70 denote operational machineries for inputting various operational instructions of the system control circuit 50, and are comprised of combinations of one or multiples of components such as switch, dial, touch panel, pointing mechanism by detection of line of sight, and voice recognition device. Below, detailed explanation of these operational machineries is provided.

A mode dial switch 60 is used for switching the setting to various modes such as power off, automatic shooting mode, shooting mode (including panoramic shooting mode and moving image shooting mode), playback mode, multi-screen playback/delete mode, and PC connection mode. A shutter switch (SW1) 62 is turned ON in during operation of the shutter button 61, and gives out instructions to initiate operations such as AF (auto-focus) processing, AE (auto-exposure) processing, AWB (auto white balance) processing, and EF (Electronic flash pre-emission) processing. Another shutter switch (SW2) 64 is turned ON when the operation of the shutter button 61 is completed, and gives out instructions to initiate exposure processing wherein signals read out from the image capturing element 14 are passed through the A/D converter 16 and the memory control circuit 22 and then the image data is written into the memory 30. At the same time, an instruction is given to initiate a sequence of processing involving image developing processing using the calculation at the image processing circuit 20 and the memory control circuit 22 and recording processing in which image data is read out from the memory 30, compressed at the compression/decompression circuit 32, and writing the image data into either one or the recording media 200 and 210. Further, when shooting a moving image, start and end of the moving image are instructed.

An image display ON/OFF switch 66 is able to set the image display unit 28 ON or OFF. With this function, when imaging is performed using the optical finder 104, it is possible to save electricity by cutting off the supply of electric current to the image display unit 28 comprising TFT, LCD, etc. A quick review ON/OFF switch 68 sets the quick review function that automatically plays back the captured image data immediately after capturing. In this particular embodiment, the function for turning on and off the quick review function is to be included when the image display unit 28 is turned OFF.

An operation unit 70 is made of various kinds of buttons and touch panels. Specific examples of such include: menu button; set button, macro button, multi-screen playback and page break button; flash setting button, single/rapid-fire/self-timer switch button; menu move+ (plus) button; menu move− (minus) button; captured image quality selection button; exposure correction button; date/time setting button; selection/switching button for selecting and switching between various functions; determination button which determines and executes various functions; display button which sets ON/OFF of the image display unit 28; quick review ON/OFF button which sets quick review function that automatically plays back image data immediately after capturing; zoom operation unit that adjusts zoom and field of view when capturing images, and performs adjustment of magnification/reduction of displayed images and switching between single/multiple image display when playing back images; and compression mode switch for selecting JPEG (Joint Photographic Expert Group) compression rate, or selecting a CCDRAW mode in which signals of the image capturing element is digitalized without change and recorded in a recording medium.

A power supply control unit 80 performs detection of presence/absence of loaded battery, type of battery and remaining capacity, and supplies to various parts including the recording media required electric voltage for required time length, according to the detection result and the instruction from the system control circuit 50. 82 and 84 are connectors, and 86 is a power supply unit comprised of parts such as primary batteries such as alkali batteries and manganese batteries, secondary batteries such as NiCd batteries, NiMH batteries, and Li batteries, and an AC adaptor.

Interfaces 90 and 94 are interfaces between the digital camera 100 and recording media such as memory cards and hard discs. Connectors 92 and 96 are connectors that perform connection between the digital camera 100 and recording media such as memory cards and hard discs. A recording medium attachment/removal detection unit 98 detects whether the recording medium 200 or 210 is attached to the connector 92 or 96.

In this embodiment, the digital camera 100 is explained as having two lines of interfaces and connectors for attaching a recording medium. Of course, the number of interfaces and connectors for attachment of recording medium can be one or more. Further, it can also be arranged to comprise a combination of interfaces and connectors of different specifications. As the interfaces and connectors, ones that follow the specifications of PCMCIA cards and CF (Compact Flash™) cards can be used. Further, by connecting various communication cards to the interfaces 90, 94 and connectors 92 and 96, it is possible to transfer image data and their management information with other devices.

The lens barrier 102 covers the shooting unit including the lens 10 of the digital camera 100 thereby protecting the shooting unit from accumulation of dirt and damages. The optical finder 104 enables shooting without using the electronic finder function by the image display unit 28. Further, within the optical finder 104, parts of the functions of the display unit 54, such as focus display, camera shake warning, flash charge display, shutter speed, aperture value, exposure correction, are placed. 106 is the image display unit position detector which can detect whether the image display unit 28 is stored with the display region facing the digital camera 100. If it is detected that the display unit 28 is stored with the display region facing the camera, display operation of the image display unit 28 is stopped in order to prevent unnecessary usage of electricity.

The external output connection detector 108 can detect whether an external monitor is connected to the external output connector 27. When connection is detected, it is possible to use the external monitor as a display device instead of the image display unit 28. 109 is an RTC (Real Time Clock) having an internal power supply separate from the power supply control unit 80, and can maintain the clock operation even when the power supply unit 86 is not supplying any electric power. The system control circuit 50 controls the timer using time acquired from the RTC 109 at the time of startup.

A communication unit 110 possesses various communication functions. The communication functions may be any one of RS 232C, USB, IEEE1394, P1284, SCSI, modem, LAN, wireless communication, and the like. A connector or an antenna 112 (in the case of wireless communication) connects the digital camera 100 to other devices using the communication unit 110.

A microphone 114 functions as an audio data capturing unit. 116 is an A/D converter, which A/D converts the audio data captured by the microphone 114 in order to acquire the data at the system control circuit 50. 118 is a speaker, and functions as an audio data playback unit. 120 is a D/A converter, which D/A converts the digital audio data output from the system control circuit 50 to play it back with the speaker 118.

The reference numerals 200 and 210 denote the recording media such as memory cards and hard discs. The recording media 200 and 210 comprise: recording units 202 and 212 which are made with a semiconductor memory or a magnetic disc; the interfaces 204 and 214 for interfacing with the digital camera; and connectors 206 and 216 which connect the digital camera 100. Further, when these recording media 200 and 210 are connected to PCMCIA-specified PC-cards or CFs, an information recording circuit in which capability is recorded is often built in.

[Overall Operation of the Digital Camera]

Figure 2:
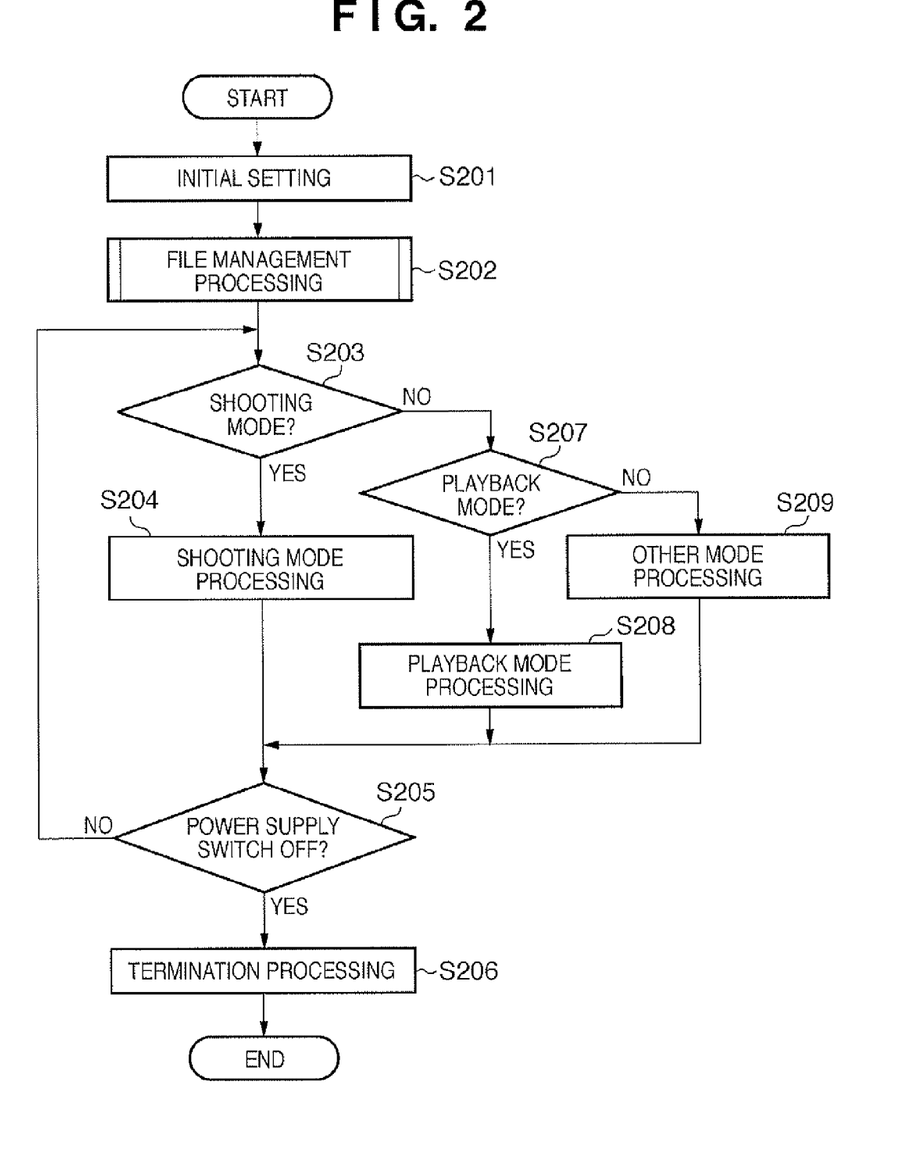
FIG. 2 is a flowchart indicating overall operation of a digital camera 100 according to an embodiment.

FIG. 2 is a flowchart which explains the overall operation of the digital camera 100 of the present embodiment. From here on, file management processing for the recording medium 200 will be explained. However, it is obvious that an identical file management processing can also be applied to the recording medium 210. Further, the term time is an umbrella term including date (year/month/day), clock time, date+clock time, etc.

If the power is switched to ON by the operation of the power supply unit 86, the system control circuit 50 at step S201 initializes flags, control variables, etc. Further, the system control circuit 50 acquires time data from the RTC 109 and performs setting of the system timer. Subsequently, at step S202, management processing relating to files stored in the recording medium 200 is initiated. Explanation regarding the file management processing of step S202 will be explained later with reference to FIG. 3.

Then, at steps S203 and S207, the system control circuit 50 determines the setting position the mode dial 60. If the current setting is shooting mode, the process moves on from step S203 to step S204, and performs shooting mode processing. If the mode dial 60 is set to playback mode, the process moves through steps S203 and S207 and to step S208, and performs playback mode processing.

Further, when set to a mode other than those described above, the process moves to step S209 and the system control circuit 50 performs processing in accordance with the selected mode. Other modes include, for example, transmitting mode processing wherein files stored in the recording medium 200 are transmitted, and receiving mode wherein files are received from external device(s) and stored in the recording medium 200.

After performing processing which is appropriate for the mode set by the mode dial 60 in one of steps S204, S208 and S209, the process moves to step S205. At step S205, the system control circuit 50 determines the set position of the power supply unit 86. If the power supply unit 86 is set to power ON, the process returns to step S203. On the other hand, if the power supply unit 86 is set to power OFF, the process moves on from step S205 to step S206, and the system control circuit 50 performs termination processing. In the termination processing, for example, the display on the image display unit 28 is changed to indicate termination state, closes the lens barrier 102 to protect the shooting unit, records parameters including flags and control variables, setting values, set modes in the nonvolatile memory 56, and cuts off power supply to parts that does not require electricity. When the termination processing of step S206 ends, the whole process comes to an end and the power supply is moved to OFF.

[Regarding File Management Processing]

Figure 3:
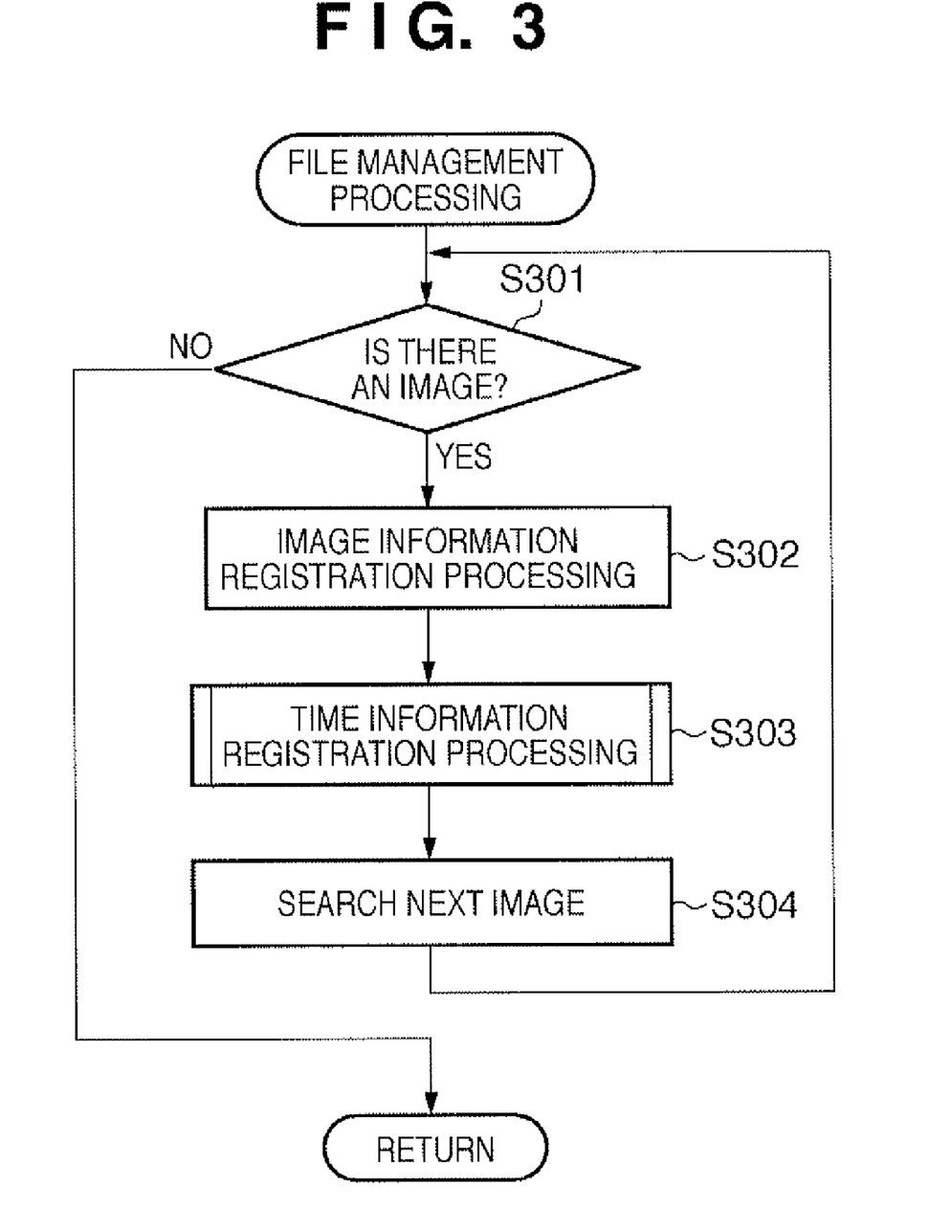
FIG. 3 is a flowchart indicating file management process of the digital camera 100 according to an embodiment.

FIG. 3 is a flowchart which explains the file management processing (step S202) of the digital camera 100 of the present embodiment. The flowchart of FIG. 3 indicates details of step S202 of FIG. 2.

At step S301, the system control circuit 50 determines whether there is any image stored in the recording medium 200. If it is determined that there is an image(s), then the process moves on to the image information registering process of step S302, and if no image is determined to exist, the file management processing is terminated. At step S302, the system control circuit 50 acquires image file information stored in the recording medium 200, and registers the image file information to, for example, the memory 52. The image file information is information which is written in directory entry, and is information which can be acquired without analyzing files such as file name, file size, and time stamp (modification time, creation time). The structure of directory entry will be explained later with reference to FIG. 5. Subsequently, the process advances to step S303, and the system control circuit 50 performs time information registration processing for registering the time to be used for search of image files as time management information. Then the process moves to step S304. Explanation regarding time information registration processing will be provided in FIGS. 4A, 4B and 4C. At step S304, the system control circuit 50 searches for the next image registered at the recording medium 200, and the process returns back to step S301.

[Regarding Time Information Registration Processing]

Figure 4A:
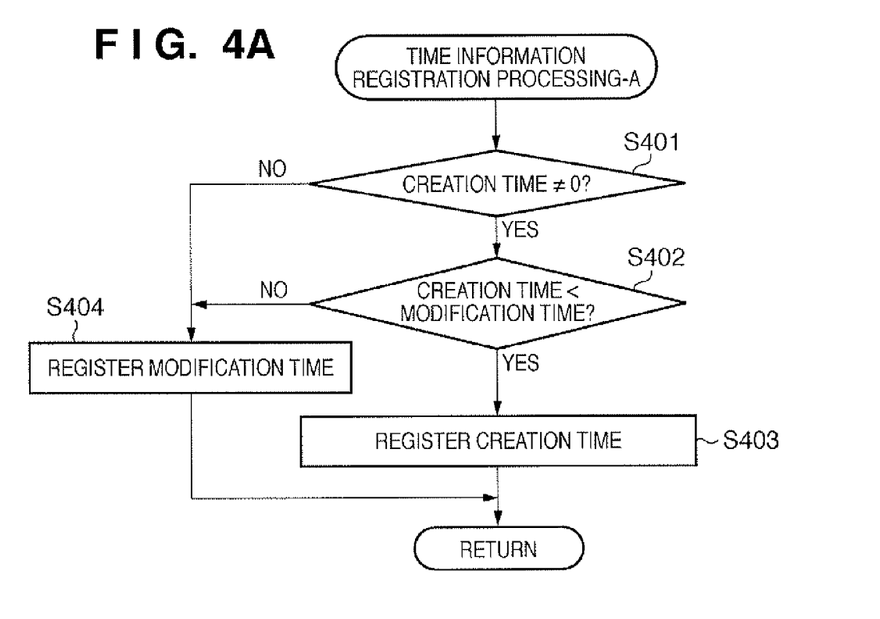
FIG. 4A is a flowchart indicating time information registering processing of the digital camera 100 according to an embodiment.
Figure 4B:
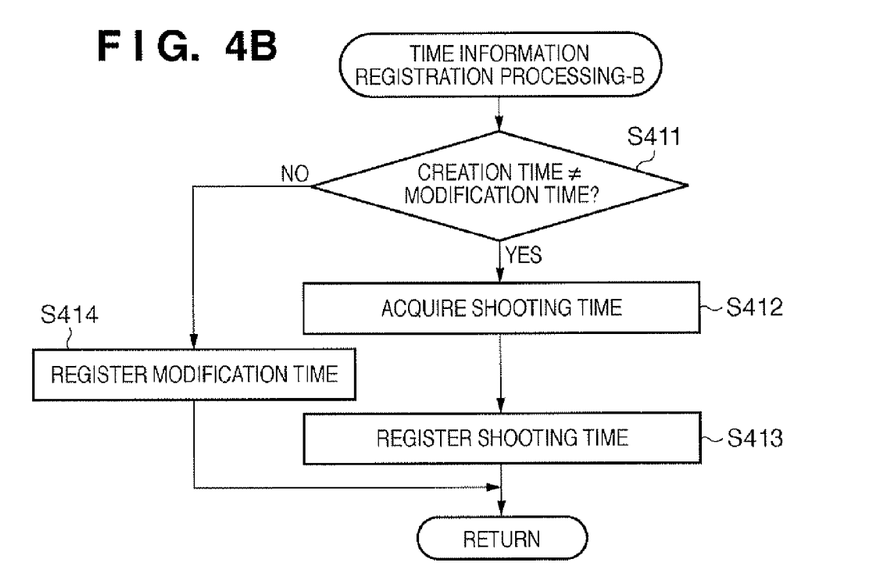
FIG. 4B is a flowchart indicating another example of time information registering processing of the digital camera 100 according to an embodiment.
Figure 4C:
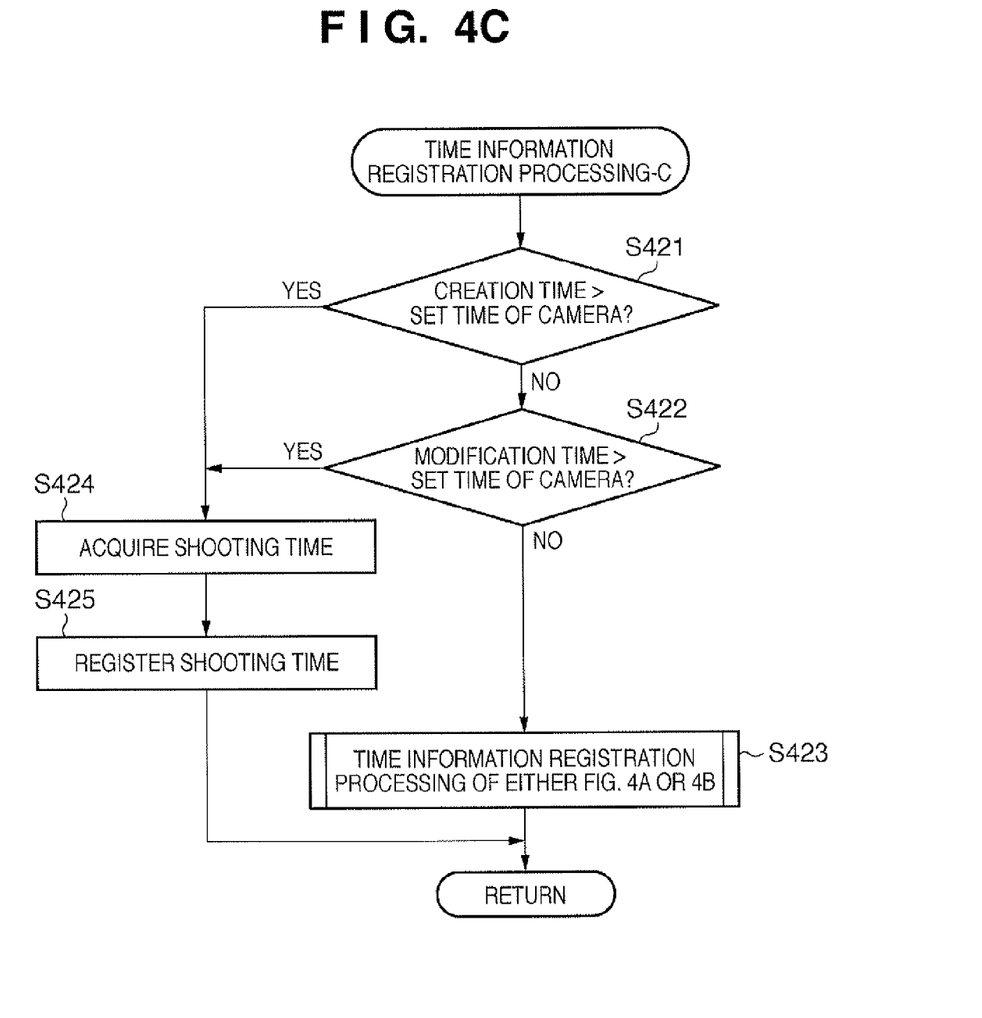
FIG. 4C is a flowchart indicating yet another example of time information registering processing of the digital camera 100 according to an embodiment.

FIGS. 4A, 4B and 4C are flowcharts explaining the time information registration processing by the digital camera 100 of the present embodiment, each indicating details of step S303 of FIG. 3. The three different types of time information registration processing shown in FIGS. 4A, 4B and 4C will be explained below.

FIG. 4A shows time information registration processing which compares creation time and modification time, and registers the older of the two (if they are identical, then the identical time is registered) as the time management information. First, at step S401, the system control circuit 50 determines the creation time acquired at step S302 of FIG. 3. If the creation is 0 then the process moves to step S404, otherwise to step S402.

Subsequently, at step S402, the system control circuit 50 compares the creation time and the modification time acquired at step S302. If the value of the creation time turns out to be smaller (i.e., creation time is older) from the comparison, the process moves to step S403. On the other hand, if the value of the creation time is less than the value of the modification time (i.e., the modification time is older, or the two times are identical), the process moves to step S404. At step S403, the system control circuit 50 registers the creation time as time management information in the memory 52. Further, at step S404, the system control circuit 50 registers the modification time as the time management information in the memory 52. When the time management information is registered at either one of steps S403 and S404, the time information registration processing is terminated. As discussed above, in the time information registration processing shown in FIG. 4A, if the creation time and the modification time match as a result of comparison of the creation time and the modification time, then that time is registered as the time management information of the concerned image file. If the two times do not match, then the older of the two is stored as the time management information.

FIG. 4B shows time information registration processing wherein creation time and modification time are compared, and in cases where the two times are the same, the identical time is registered as the time management information, and if the two times differ, then information regarding shooting time written as information within the image file is registered as the time management information. In the present embodiment, image files are to be files of Exif format, and the shooting time included in the Exif information is acquired and registered as the time management information.

At step S411, the system control circuit 50 determines whether the creation time and the modification time acquired at step S302 of FIG. 3 are the same. If they are the same, the process moves to step S414, and the system control circuit 50 registers the modification time (or the creation time) as the time management information, and terminates the time information registration processing. On the other hand, if the creation time and the modification time are determined to be different, then the process moves to step S412. At this step, the system control circuit 50 analyzes the image file data and acquires shooting time written in the Exif information. Explanation regarding data structure of Exif format image files will be explained later with reference to FIG. 6. Subsequently, the process moves from step S412 to step S413, and the system control circuit 50 registers the shooting time acquired at step S406 as time management information, and terminates the time information registration processing.

In the time information registration processing shown in FIG. 4C, creation time and modification time are individually compared to the current time that the system timer indicates, and if the creation time or the modification time contain values which are larger than the value of the system timer (i.e., the time is newer than the current time), the shooting time is acquired from the image file and is registered as the time management information. If the values that are lower than the value indicated by the system timer, (i.e., the times are identical or older than the current time) are found in the creation time and the modification time, then the time management information is registered according to the method of either FIG. 4A or 4B.

At step S421, the system control circuit 50 compares the creation time acquired at step S302 of FIG. 3 with the value of the clock of the RTC 109. If the creation time is determined to be a value larger than that of the clock value, the process moves to shooting time acquisition processing of step S424, and if the clock value is determined to be equal to or larger than the creation time value, the process moves to step S422.

At step S422, the system control circuit 50 compares the modification time acquired at step S302 of FIG. 3 and the clock value of the RTC 109 (current time). If the clock value is determined to be equal to or larger than the value of the modification time, the process moves to step S423, and the system control circuit 50 performs the time information registration processing described in either one of FIGS. 4A and 4B. Further, if the modification time is determined to be a larger value than the clock value, the process moves to the shooting time acquisition processing of step S424.

At step S424, the system control circuit 50 analyzes the image file data, and acquires the shooting time written in the Exif information. The structure of Exif-format image file data will be explained later with reference to FIG. 6. Subsequently, the process moves on from step S424 to step S425, where the system control circuit 50 registers the shooting time acquired at step S424 as time management information, and terminates time information registration processing.

[Regarding Directory Structure]

Figure 5:
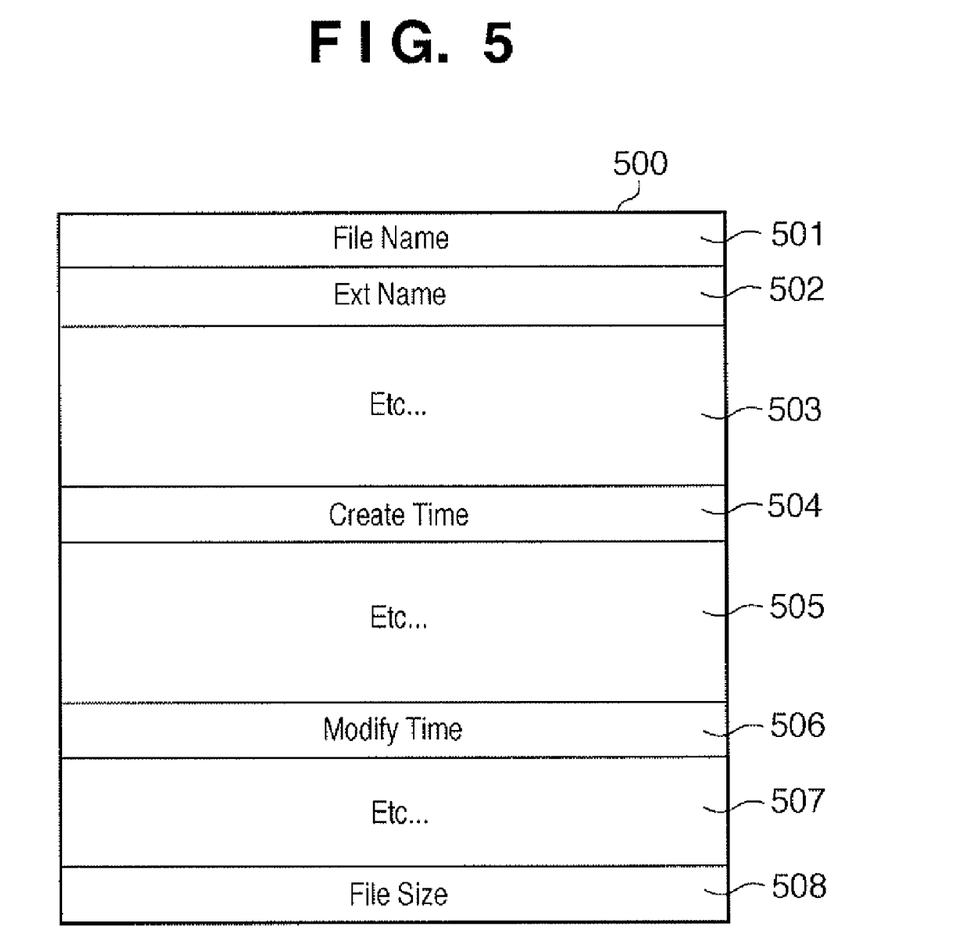
FIG. 5 is a diagram showing an example of data structure of directory entry.

FIG. 5 shows an example of data structure of directory entry recorded in the recording medium 200. The directory entry for files and directory 500, which are recorded on the recording medium 200, records the following:

File or directory name (file name) 501;
Extension name 502;
Creation time 504;
Modification time 506;
File size 508; and
Other file system information 503, 505 and 507.

In the above structure, the creation time 504 and the modification time 506 are the creation time and modification time used for the time information registration processing described above.

[Regarding Image File Structure]

Figure 6:
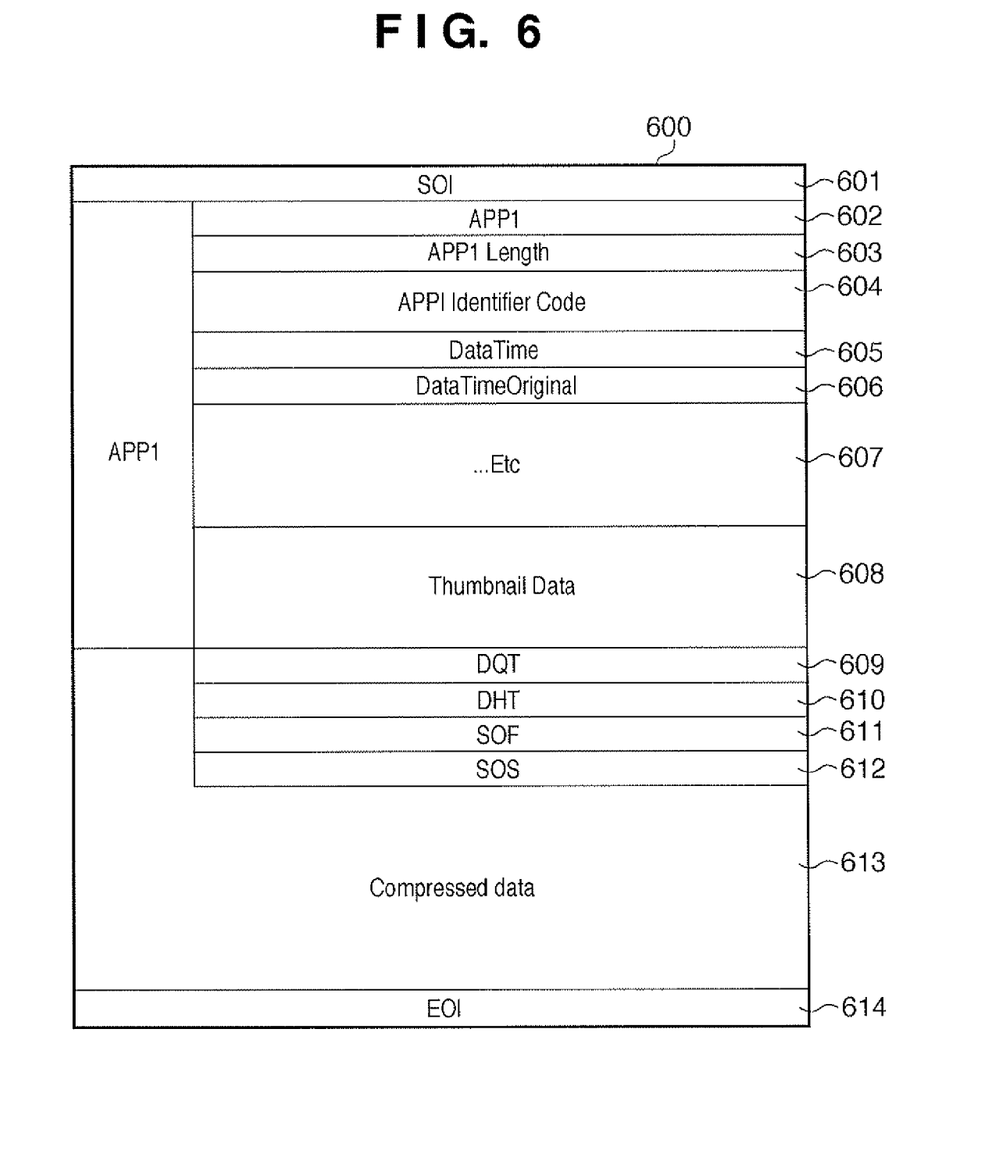
FIG. 6 is a diagram showing an example of data structure of an image file in Exif format.

An example of data structure of still image file (Exif format image file) data stored in the recording medium 200 is shown in FIG. 6. An image file 600 has at its beginning a marker (SOI) 601 indicating the start of the image file, and as an application marker (APP1) 602, which is equivalent to a header portion, behind the marker 601. The application (APP1) marker 602 is comprised of:

Size (APP1 length) 603;
Application marker recognition code (APP1 Identifier Code) 604;
Creation time (Date Time) of image data 605;
Shooting time of image (date Time Original) 606;
Other shooting information 607 and thumbnail image (thumbnail data) 608.

The shooting time 606 of the above-mentioned structure is the shooting time of the Exif information within the image which was previously discussed in step S412 of FIG. 4B and step S424 of FIG. 4C.

Further, the image data recorded in the image file 600 is comprised of quantization table (DQT) 609, Huffman table (DHT) 610, start of frame marker (SOF) 611, start of scan marker (SOS) 612 and compression marker 613. And it ends with a marker 614 which indicates the end of image file data (EOI).

An example of playback processing (the example of playback mode processing at step S208) by a digital camera which utilizes the present invention will be described below.

In FIG. 7, 701 to 704 are examples of image content stored in the recording medium 200. Image file 701 (image A hereinafter) is an image which is created on October $1^{st}$ (shown as 10/1 hereinafter) by the digital camera 100. In the data of image A, shooting time 10/1 is recorded as Exif information, and creation time 10/1 and modification time 10/1 are each recorded in the directory entry. Subsequently, image file 702 (image B hereinafter) is an image which is captured on 10/1 and modified on 10/2. In the Exif information within the data of image B, shooting time is recorded as 10/1, and directory entry records creation time 10/1 and modification time 10/2 on which modification occurred.

Figure 7:
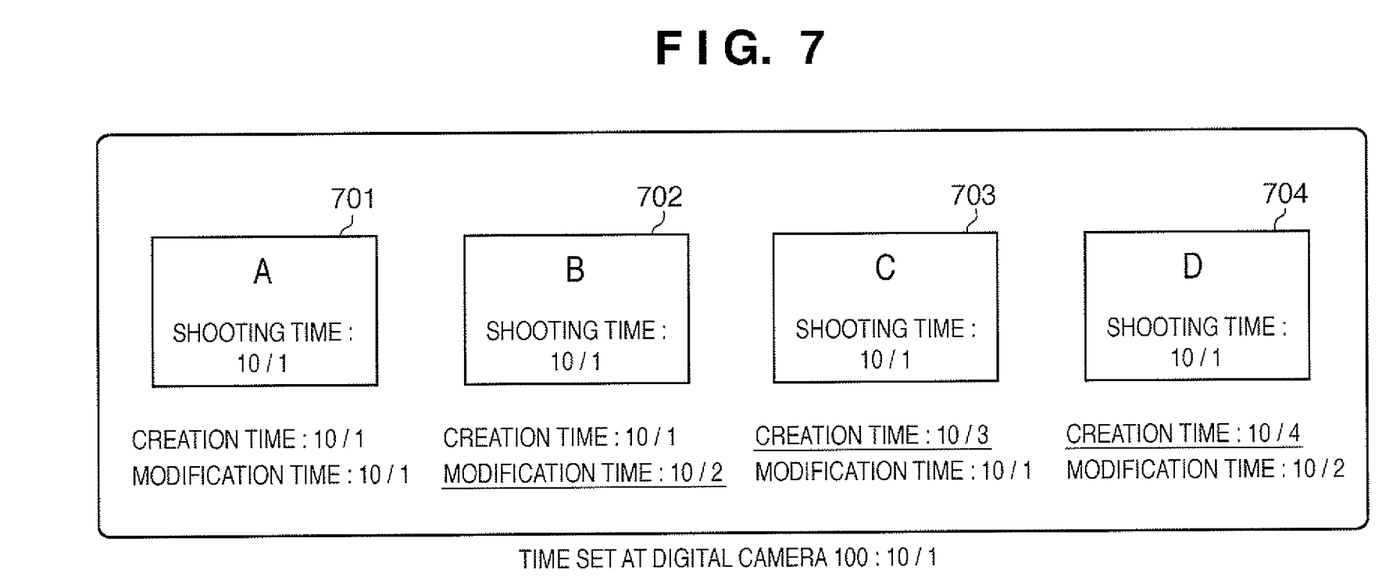
FIG. 7 is a diagram showing an example of an image file stored in a recording medium.

Image file 703 (image C hereinafter) is acquired by storing image A in a computer (PC hereinafter) and copying it back to the recording medium 200 on 10/3. Within the data of image C, the Exif information of image A is copied, thus making its shooting time 10/1. In the directory entry, the time of 10/3 at which the copy was made from the PC is stored as the creation time of image C, the modification time of 10/1 of image A is inherited without change. Image file 704 (image D hereinafter) is acquired by storing image B in the PC and copying it back to the recording medium 200 on 10/4. Within the data of image D, the Exif information of image B is copied, thus making its shooting time 10/1. Further, in the directory entry, the time of 10/4 at which the copy was made from the PC is stored as the creation time of image D, the modification time of 10/2 of image B is inherited without change.

Assume that the digital camera 100 having four images having above-described structures is turned on, initial setting described in step S201 of FIG. 2 is performed, and then the file management processing of step S202 is performed. During the file management processing, it is determined at step S301 whether there is any image in the recording medium 200, and when the first image, image A, is found, the process moves to step S302 where image information registration process is performed. Subsequently, time information registration processing is performed at step S303.

Firstly, a situation in which the time information registration processing shown in FIG. 4A will be explained.

At step S401, it is determined whether the creation time is 0. The creation time of image A is 10/1, which differs from 0, and thus the process moves to step S402. At step S402, the creation time and the modification time are compared. In image A, the creation time and the modification time are both 10/1. Therefore, time of 10/1 is registered in the time management information, and the process skips time information registration processing and moves to step S304. At step S304, the next image (image B) is detected, and the process returns to step S301. Processing of steps S301 to S303, and steps S401 and S402 are performed as already described above. In the case of image B, the comparison at step S402 of the creation and modification times will determine the value of the creation time 10/1 to be smaller than the value of the modification time, leading to registration of 10/1 as the time management information of image B. The same process is performed for images C and D, for which the time management information will be 10/1 and 10/2, respectively.

A situation will be explained in which date jump (time information of images are searched for and jump is made to an image having preceding and succeeding images with differing dates) function is performed as processing to selectively play back images based on time management information registered for each image file as described above. When the date jump function is performed with the time management information registered as described above, image A with 10/1 will be displayed at the front. Then image D with 10/2 is displayed.

In contrast to this, if the time management information was determined using, for example, modification time only, the time management information of image A will be registered as 10/1, that of image B as 10/2, that of image C as 10/1, and that of image D as 10/2. Accordingly, the images will not be organized in the chronological order, and performing the date jump will lead to display of image A first, followed by images B, C and D. From this comparison, it is apparent that the time information registration processing shown in FIG. 4A is effective when images are modified or copied from the PC.

Further, a situation will be explained in which the time information registration processing of FIG. 4B (wherein the shooting time is acquired by analyzing image files having different creation time and modification time, and registering it as the time management information) is used. Image A has identical creation time and modification time of 10/1, which is registered as time management information. Images B, C and D have differing creation times and modification times, and thus shooting time of 10/1 is acquired from the Exif information of each image, and is registered.

When date jump function is performed with the time registration information registered in such manner, image A will be shown. In the present case, all images are treated as 10/1, it is determined that the date changing point is only at image A. In this method, it is possible to quickly register time management information because it is unnecessary to acquire the Exif information of all images as was done in the conventional methods.

Further, a situation will be explained in which the time information registration processing of FIG. 4C (wherein creation time and modification time are compared to the current time set at the digital camera 100, and registering the shooting time as the time management information when the compared values indicate future times in relation to the clock time) is used. Firstly, the current time of 10/1 set in the digital camera 100 is compared to the creation time 10/1 and modification time 10/1 of image A. In this comparison, because the current time according to the clock is identical to the modification and creation times, the time of 10/1 is registered as the time management information by the time information registration processing of either FIG. 4A or 4B. Subsequently, creation and modification times of image B are compared to the current time indicated by the clock in the same manner. Since the modification time of 10/2 is a future time in comparison to the current time of 10/1, the Exif information of image B is acquired, and the shooting time of 10/1 is registered as the time management information. Likewise, since the creation and modification times are future times in relation to the current time, the Exif information of each image is acquired, and the shooting time of 10/1 is registered.

When the date jump function is performed using the time management information registered in this manner, image A is displayed. In this example, all images are treated equally as 10/1, and it is thus determined that the point of date change is only at image A.

With this method, it is possible to avoid using obviously incorrect creation and modification times, allowing registration of correct time management information.

As described above, according to the time information registration processing of the present embodiment, whether the shooting time acquired by analyzing image files are to be used as time management information which is utilized for image file search, etc., is determined using the time stamp of image files. In other words, regarding acquisition of time management information, it is determined whether analysis of image files is to be performed based on creation time and modification time included in the time stamp, which allows high speed file operation. Further, when the creation time and the modification time differ, either the older of the two times or the shooting time within the image file is used, allowing high speed play back and search of a certain level without discriminating image creation source.

According to the present invention, an image playback apparatus which performs high speed search and playback of image files based on time information and the method thereof are provided.

The present invention is described using a digital camera, but is not limited to this particular example and can also be applied to devices capable of image playback such as mobile phones and mobile terminals.

Further, the present invention can be applied to a system comprised of a plurality of instruments, and can also be applied to a device comprised of a single instrument.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-006120, filed Jan. 14, 2009, which is hereby incorporated by reference herein in its entirety.

What is claimed is:

1. An image playback apparatus which is capable of playing back image files recorded in a recording medium, comprising:
    an acquiring unit configured to acquire a creation time and a modification time of each of the image files;
    a registering unit configured to compare the creation time and the modification time acquired by the acquiring unit, then register the older of the times if the times do not match, as time management information of each of the image files; and
    a playback unit configured to play back the image files based on the time management information registered for each of the image files by the registering unit.

2. The apparatus according to claim 1, wherein the acquiring unit acquires the creation time and the modification time from directory entry.

3. The apparatus according to claim 1, further comprising a holding unit configured to hold a present time, wherein:

when at least one of creation time and modification time of an image file indicates a future time in comparison to the present time held at the holding unit, the registering unit registers a shooting time written as information within the image file as the time management information for the image file.

4. An image playback apparatus which is capable of playing back image files recorded on a recording medium, comprising:
an acquiring unit configured to acquire a creation time and a modification time of each of the image files;
a holding unit configured to hold present time
a registering unit configured to register a shooting time written in each of the image files as time management information when at least one of the creation time and the modification time indicates a future time in comparison to the present time held at the holding unit; and
a playback unit configured to play back the image files based on the time management information registered for each of the image files by the registering unit.

5. The apparatus according to claim 4, wherein the acquiring unit acquires the creation time and the modification time from directory entry.

6. The apparatus according to claim 4, wherein:
the image file is in Exif format; and
the registering unit analyzes the image file and acquires the shooting time from Exif information.

7. A method of controlling an image playback apparatus which is capable of playing back image files recorded on a recording medium, comprising steps of:
acquiring a creation time and a modification time of each of the image files;
comparing the creation time and the modification time acquired in the acquiring step, then registering the older of the times if the times do not match, as time management information of the image file; and
playing back the image files based on the time management information registered for each of the image files by the registering unit.

8. A method of controlling an image playback apparatus which is capable of playing back image files recorded on a recording medium, comprising steps of:
acquiring a creation time and a modification time of each of the image files;
holding present time in a holding unit;
registering a shooting time written in each of the image files as time management information when at least one of the creation time and the modification time indicates a future time in comparison to the present time held at the holding unit; and
playing back the image files based on the time management information registered for each of the image files by the registering unit.

9. A computer readable storage medium storing a program which can execute the control method of the image playback apparatus according to claim 7.

10. A computer readable storage medium storing a program which can execute the control method of the image playback apparatus according to claim 8.

11. The apparatus according to claim 1, wherein the registering unit registers a matching time if the creation time and the modification time match.

12. The method according to claim 7, wherein the registering step registers a matching time if the creation time and the modification time match.

13. The apparatus according to claim 4, wherein the registering unit registers the shooting time written in each of the image files as time management information when the creation time and the modification times differ.

14. The apparatus according to claim 13, wherein the registering unit registers either one of the creation time and the modification time when the creation time and the modification times match.

15. The method according to claim 8, wherein the shooting time written in each of the image files is registered as time management information when the creation time and the modification times differ.

16. The method according to claim 15, wherein either one of the creation time and the modification time is registered when the creation time and the modification times match.

* * * * *